United States Patent

[11] 3,568,606

| [72] | Inventor | Howard E. Grant<br>c/o Trans World Car Wash Systems, Inc 65 Marine St, Farmingdale, N.Y. 11735 |
|---|---|---|
| [21] | Appl. No. | 786,276 |
| [22] | Filed | Dec. 23, 1968 |
| [45] | Patented | Mar. 9, 1971 |

[54] AUTOMOBILE-WASHING UNIT CONVEYOR
8 Claims, 5 Drawing Figs.

[52] U.S. Cl. ................................................. 104/172
[51] Int. Cl. ................................................. B65g 17/42
[50] Field of Search .......................................... 104/163, 172, 176

[56] References Cited
UNITED STATES PATENTS

| 3,058,433 | 10/1962 | Hurst | 104/172 |
| 2,729,172 | 1/1956 | Grossmith | 104/172 |
| 3,196,806 | 7/1965 | Brunder | 104/172 |

Primary Examiner—Arthur L. LaPoint
Assistant Examiner—Robert W. Saifer
Attorney—Friedman & Goodman ABSTRACT: For use in a car or automobile-washing unit in the operation of which an automobile is moved along a prescribed path in association with various apparatus for cleaning different parts of the automobile, a conveyor for urging the automobile along such path of movement including chain-driven roller arrangements which each have a freely rotatable idler roller in pushing contact with the automobile wheel and thus permits unimpeded rotation of the automobile wheel during movement of the automobile along the path of movement.

Patented March 9, 1971

INVENTOR.
HOWARD E. GRANT
BY Friedman & Goodman
Attorneys

INVENTOR.
HOWARD E. GRANT
BY
Friedman & Goodman
Attorneys

AUTOMOBILE-WASHING UNIT CONVEYOR

The present invention relates generally to automobile-washing units in the operation of which use is made of various apparatus to clean different parts of the automobile, and more particularly to an improved conveyor for urging the automobile through movement in cleaning association with these various apparatus.

In current use are numerous embodiments of automobile-washing units which have in common a mode of operation wherein the automobile is urged along a path of movement in association with different apparatus strategically located and designed to clean a different part of the automobile. Consistent with the popularity and proven commercial acceptance of these units there is a continuing effort by equipment manufacturers to provide improved apparatus for these units, particularly the apparatus for imparting movement to the automobile. Some known movement-imparting apparatus include an endless conveyor chain having hooks and the like by which suitable connection is made to the automobile causing movement thereof simultaneously with movement of the chain, but these have the disadvantage of requiring effort and time to make the initial engagement to and the subsequent disengagement from the chain. In other known apparatus, the automobile is driven into an enclosing structure attached to the chain which, although obviating the necessity of making any engaging connection and subsequent disengagement, has the disadvantage of interfering with the cleaning of the automobile to the extent that it encloses the automobile wheels and thereby interferes with cleaning access to these wheels.

Broadly, it is an object of the present invention to provide an improved automobile-washing unit conveyor overcoming the foregoing and other shortcomings of the prior art. Specifically, it is an object to provide a conveyor for an automobile-washing unit utilizing chain-driven roller units which are brought into pushing contact with the automobile wheels to effectively urge the automobile through movement without interfering with or blocking cleaning access to the automobile wheels.

An automobile-washing unit conveyor demonstrating objects and advantages of the present invention includes an endless conveyor chain arranged with the elongated runs thereof aligned with the path of movement, the chain having plural roller arrangements connected at spaced locations therealong in operative positions laterally projected therefrom and in such positions effective to contact the automobile wheels and thereby cause movement of the automobile simultaneously with movement of the chain. Each roller arrangement further includes an idler roller mounted in a clearance position from the riding surface for the automobile and operatively arranged to make the contact with the automobile wheel, whereby the rotation of the automobile wheel during movement of the automobile along the riding surface is not impeded in any way since the idler roller is free to and does rotate while maintaining pushing contact against the automobile wheel.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
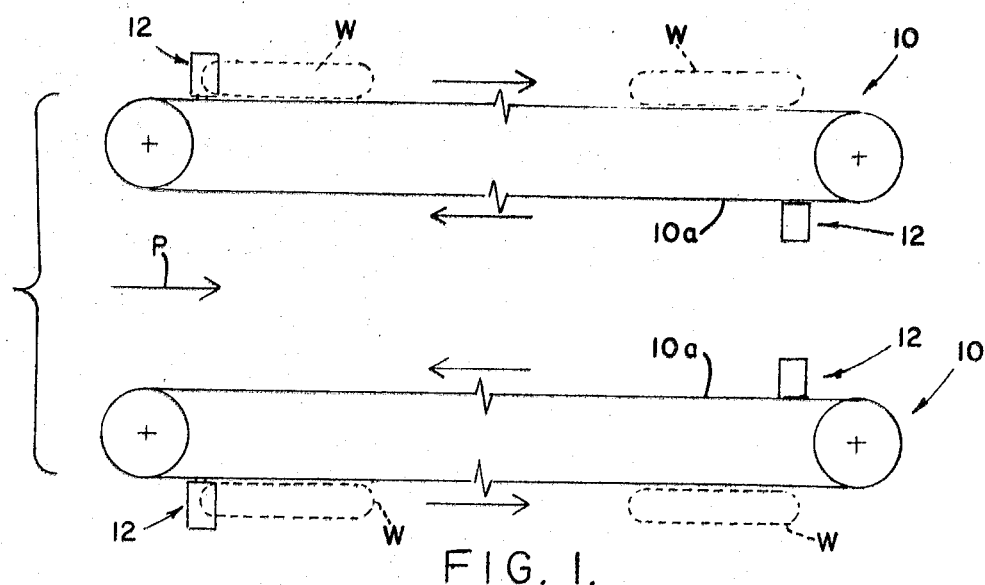
FIG. 1 is a diagrammatic plan view of an automobile-washing unit conveyor according to the present invention in which the wheels of an automobile being urged through movement by said conveyor are illustrated in phantom perspective.

Reference is now made to the drawings, and in particular to FIG. 1, wherein there is shown a diagrammatic view of a cooperating pair of conveyors, each generally designed 10, demonstrating objects and advantages of the present invention. Since the conveyors 10 are identically constructed, the description of one will suffice for present purposes. Each conveyor 10 will be understood to be disposed along a path of movement of an automobile-washing unit of the type in which the automobile is urged through movement by the conveyors 10 in cleaning contact with cleaning equipment and apparatus arranged along the path of movement. Specifically, the conveyors 10 hereof are strategically located centrally of the path of movement P such that the wheels W of the automobile processed through the washing unit are located on riding surfaces or tracks T (see FIG. 2) located adjacent the outwardly disposed elongated runs of each conveyor 10. As will be described in greater detail herein, plural roller arrangements, generally designated 12, of which only two are illustrated in connection with each of the conveyors 10 in FIG. 1, are appropriately connected at spaced locations along each conveyor 10 in operative positions laterally projected therefrom and in such laterally projected positions are effective to make pushing contact against the rear wheels of the automobile being processed in this manner are effective in urging this automobile through movement along the path of the washing unit. To achieve this, each conveyor 10, as will be described in greater detail subsequently, includes an endless conveyor chain 10a which is powered in an appropriate direction such that the outwardly disposed run moves in an appropriate direction to cause movement of the automobile along the path P. In the illustrated embodiment of FIG. 1, the upper conveyor 10 is thus powered in clockwise rotation whereas the cooperating conveyor 10 disposed adjacent thereto is powered in counterclockwise rotation.

Figure 2:
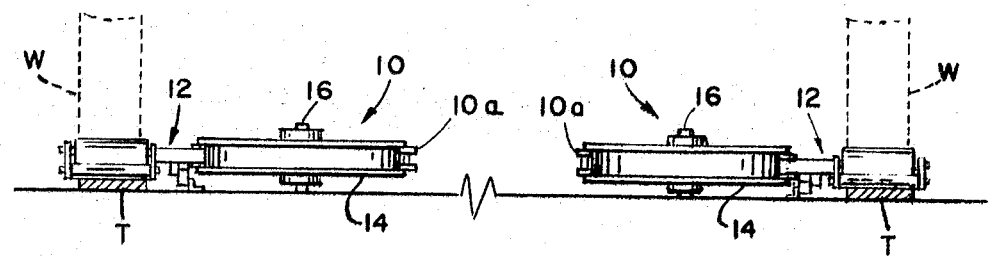
FIG. 2 is a front elevational view of the conveyor, the rear wheels of an automobile being urged through movement by the conveyor being similarly shown in phantom perspective.

As may best be appreciated by a comparison of FIGS. 1, 2, each conveyor 10 includes, as already noted, an endless loop of conveyor chain 10a which, at its opposite ends, is appropriately entrained about a pair of spaced-apart horizontally oriented 14, each of which is journaled for rotation about a vertically oriented axis 16.

Figure 3:
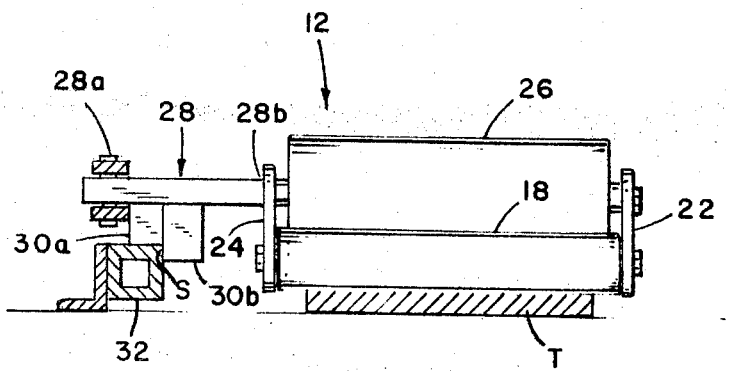
FIG. 3 is also a front elevational view, but on an enlarged scale and showing only one of the conveyors, portions thereof being in section to better illustrate the structural features thereof.
Figure 4:
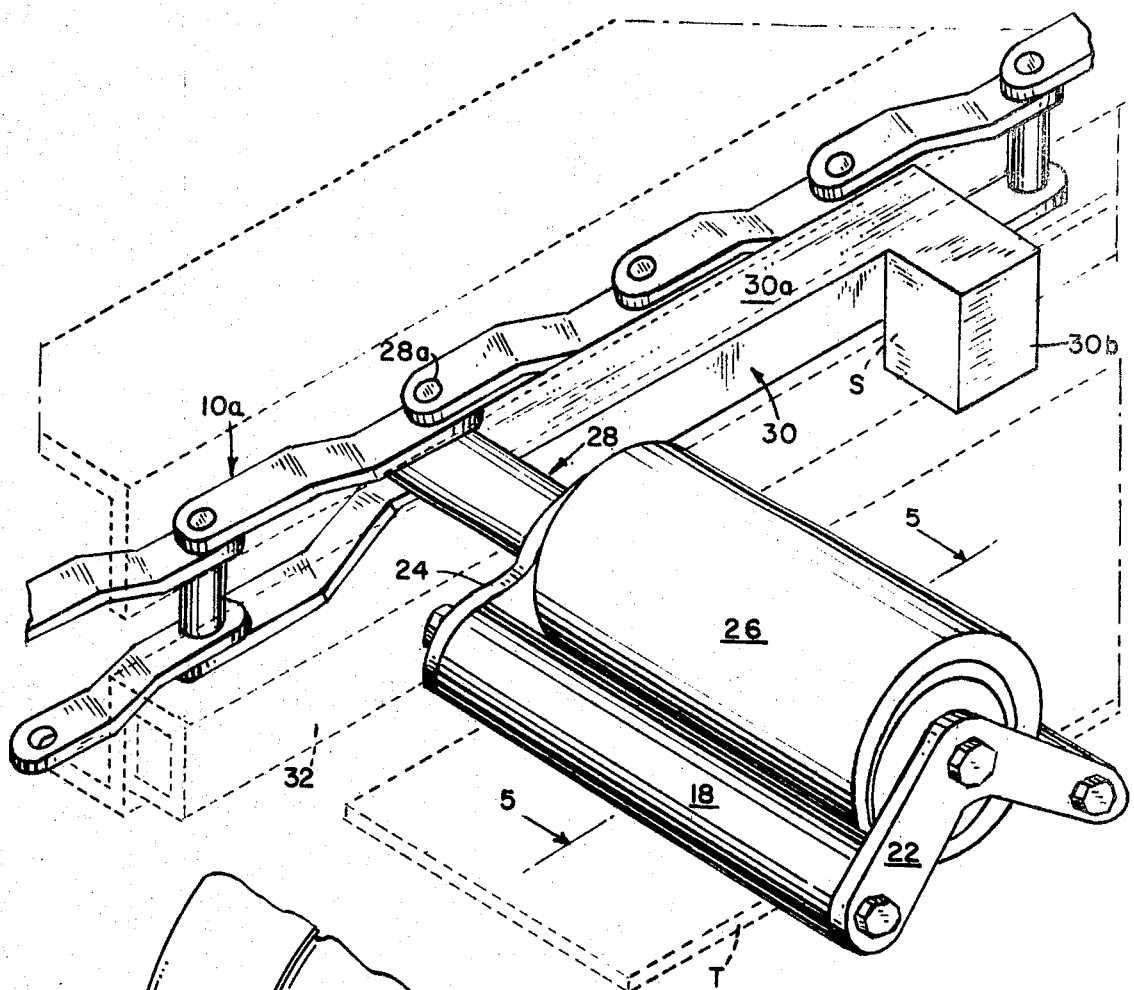
FIG. 4 is an enlarged perspective view of the conveyor in which the supporting structure thereof is illustrated in phantom perspective.
Figure 5:
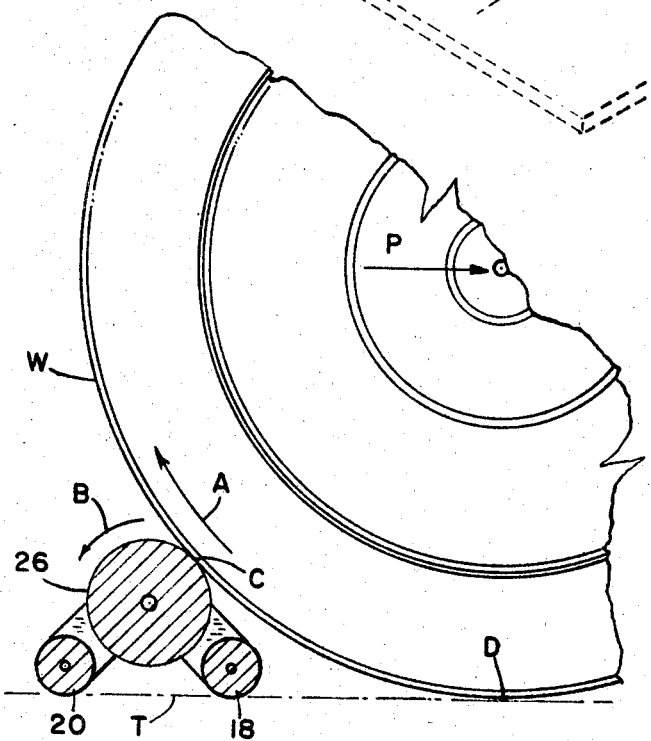
FIG. 5 is an enlarged elevational view, in section taken on line 5—5 of FIG. 4, illustrating the manner in which pushing contact is made by the conveyor against the automobile wheel.

Referring now more particularly to FIGS. 3—5, each previously noted roller arrangement 12 includes a pair of spaced apart support rollers 18, 20 which are in riding contact with the riding surface or track T and support, at opposite ends, an inverted V-sahped bracket 22, 24. Journaled for rotation at aligned points between the medial portions of the brackets 22, 24 is a comparatively large diameter idler roller 26, the diameter of this idler roller in a preferred embodiment being approximately twice the size of the diameter of each support roller 18, 20. This ratio of diameters has been found sufficient to permit pushing contact, as at C, to be established between the idler roller 26 and the automobile wheel W such that movement of the conveyor chain, to which the roller arrangement 12 is connected, is transmitted to the wheel W causing movement in the direction P. Naturally, this movement is movement of the center of the wheel W and causes the wheel periphery which is in contact with the track T, as at D, to rotate in a clockwise direction A. This clockwise rotation is of course not impeded by the idler roller 26 which, due to its clearance position with respect to the track T, is free to partake of counterclockwise rotation B, all as is clearly illustrated in FIG. 5. The preferred connection of each roller arrangement 12 to the conveyor chain 10a, as best illustrated in FIGS. 3, 4, includes a laterally extending member 28 appropriately connected at one end, as at 28a, to the chain 10a and, as its opposite end 28b is connected to the bracket 24, as by welding or the like. Connected to the lower surface of the member 28 is a rearwardly extending L-shaped tracking member 30, the long leg 30a of which is oriented in the direction of the chain 10a and the short leg 30 b of which, including specifically a depending inwardly facing bearing surface S, is in sliding contact with a rail 32 disposed adjacent and in alignment with the elongated run of the conveyor 10. That is, during pushing contact of each roller arrangement 12 against an automobile wheel W, member 30 tracks along the rail 32 and thereby limits pivotal movement of each roller arrangement 12 about the vertical axis of its connecting pin 28a to the chain 10a to thereby hold each roller arrangement 12 in its laterally projected position from the conveyor chain 10a.

From the foregoing description it should therefore be readily appreciated that the conveyor 10 hereof is effective in urging an automobile through movement along a path of movement of a washing unit from a strategic central location along said path of movement and, in this position, therefore does not interfere with cleaning access to the automobile wheels as might be the case if the roller arrangement occupied a position to the outside of the automobile wheels W.

A latitude of modification, change and substitution is intended in the foregoing disclosure and in some instances some features of the invention will be employed without a corresponding use of other features.

I claim:

1. In an automobile-washing unit of the type having means for moving an automobile on a riding surface along a prescribed path of movement in association with cleaning apparatus, a conveyor for urging said automobile along said path of movement comprising an endless conveyor chain oriented with the two facing elongated runs thereof aligned with said path of movement, and plural roller arrangements connected at spaced locations along said conveyor chain in operative positions laterally projected therefrom effective to contact the automobile wheels so as to cause movement of said automobile simultaneously with movement of said conveyor chain, each said roller arrangement including a pair of support rollers spaced apart in the direction of the path of movement of the chain and in contact with said riding surface, said rollers being disposed between a pair of spaced-apart brackets which rotatively support said rollers at their ends, an idler roller journaled for rotation at aligned points between medial portions of said brackets in an interposed supported position between said support rollers, said idler roller being mounted in a clearance position from said riding surface and operatively arranged to make said contact with said automobile wheel, whereby the rotation of said automobile wheel during movement thereof along said path of movement is not impeded by the rotating idler roller.

2. An automboile-washing unit conveyor as defined in claim 1 wherein said conveyor chain is disposed in a position relative to said path of movement resulting in a location beneath said automobile during movement thereof, whereby cleaning access to said automobile wheels is not obstructed by said roller arrangements.

3. An automobile-washing unit conveyor as defined in claim 1 including an elongated rail disposed adjacent the elongated runs of said conveyor chain and a holding means for each said roller arrangement operatively arranged to track along said rail so as to maintain said roller arrangement in said laterally projected position during pushing contact of said roller arrangement against said automobile wheel.

4. An automobile-washing unit conveyor as defined in claim 3 wherein said conveyor chain is operatively arranged in a horizontal plane.

5. An automobile-washing unit conveyor as defined in claim 1 wherein the diameter of said idler roller is twice the size of the diameter of each said support roller.

6. An automobile-washing unit conveyor as defined in claim 1 wherein there are two said conveyor chains, the roller arrangement of each of which makes pushing contact with at least one wheel on each of the two sides of the automobile being urged through movement along said path of movement.

7. An automobile-washing unit conveyor as defined in claim 3, wherein said holding means includes a laterally extending member connected at one end to said chain and connected at its opposite end to one of said brackets.

8. An automobile-washing unit conveyor as defined in claim 7, wherein said holding means further includes an L-shaped tracking member connected to a lower surface of said laterally extending member, said L-shaped member being in sliding contact with said rail, the short leg of said L-shaped member including a depending bearing surface facing towards said rail in sliding contact therewith.